United States Patent [19]

Muller

[11] Patent Number: 4,727,646

[45] Date of Patent: Mar. 1, 1988

[54] DIE SET FOR SECURING A SELF-ATTACHING ELEMENT

[75] Inventor: Rudolph R. M. Muller, Frankfurt, Fed. Rep. of Germany

[73] Assignee: Multifastener Corporation, Detroit, Mich.

[21] Appl. No.: 898,295

[22] Filed: Aug. 20, 1986

Related U.S. Application Data

[60] Continuation-in-part of Ser. No. 773,387, Sep. 6, 1985, Pat. No. 4,633,560, which is a division of Ser. No. 563,833, Dec. 21, 1983, Pat. No. 4,555,838, which is a continuation-in-part of Ser. No. 485,099, Mar. 28, 1983, Pat. No. 4,459,073, and a continuation-in-part of Ser. No. 504,074, Jun. 14, 1983, Pat. No. 4,543,701, Division of Ser. No. 229,274, Jan. 28, 1981, abandoned, Continuation of Ser. No. 229,274, Jan. 28, 1981, abandoned.

[30] Foreign Application Priority Data

Feb. 2, 1980 [DE] Fed. Rep. of Germany ....... 3003908

[51] Int. Cl.⁴ ............................................... B23P 19/00
[52] U.S. Cl. ..................................... 29/798; 29/243.52
[58] Field of Search .................. 29/798, 243.52, 283.5, 29/432, 432.1, 432.2, 512; 411/179

[56] References Cited

U.S. PATENT DOCUMENTS

| | | | |
|---|---|---|---|
| 2,053,490 | 9/1936 | Novick | 29/432.2 |
| 3,938,239 | 2/1976 | Lauth | 29/512 |
| 4,018,257 | 4/1977 | Jack | 29/512 X |
| 4,039,099 | 8/1977 | Baxall | 29/243.52 X |
| 4,064,617 | 12/1977 | Oaks | 29/798 X |
| 4,430,034 | 2/1984 | Fujikawa | 29/512 X |
| 4,490,904 | 1/1985 | Moyher | 29/798 X |
| 4,630,362 | 12/1986 | Bauer et al. | 29/432.1 X |

Primary Examiner—Charlie T. Moon
Attorney, Agent, or Firm—Cullen, Sloman, Cantor, Grauer, Scott & Rutherford

[57] ABSTRACT

A die set for attaching a self-attaching fastener having an annular barrel portion to a panel. The die set includes a driving member and a die member having a concave annular die cavity which is generally hemispherical in cross-section and which surrounds a center die post which projects from the bottom surface of the die cavity. The die post includes a conical side surface, adajcent the top face, which is inclined outwardly from the axis of the post. The top face of the die post preferably includes an annular top surface, adjacent the conical side surface, which defines a piercing edge, and a conical top surface, adjacent the axis of the post. The driving surface aligns the barrel portion of the self-attaching element with the center post of the die cavity and drives the free end of the annular barrel portion into engagement with the panel and through the opening in the panel to first engage the conical side surface of the post. The conical side surface accurately aligns the fastener on the post, begins outward radial deformation of the post and prevents collapse of the barrel portion during installation. The free end of the barrel portion is then received against the hemispherical bottom surface of the die cavity, deforming the free end of the barrel portion radially outwardly in a U-shaped configuration and the panel portion adjacent the panel opening is driven into the U-shaped barrel portion, forming a secure mechanical interlock.

8 Claims, 7 Drawing Figures

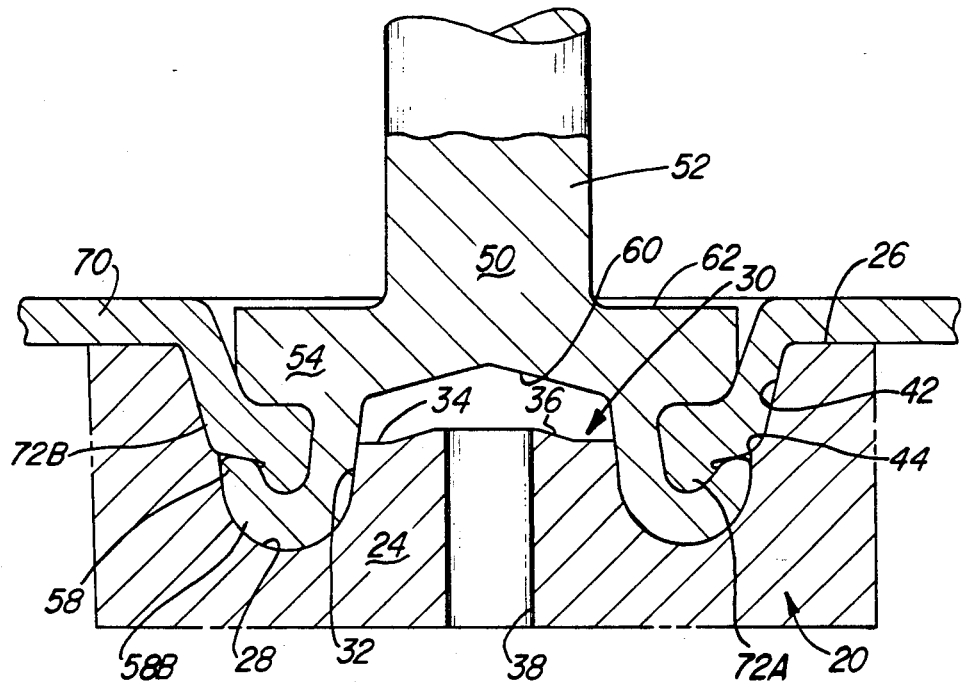
Fig-5
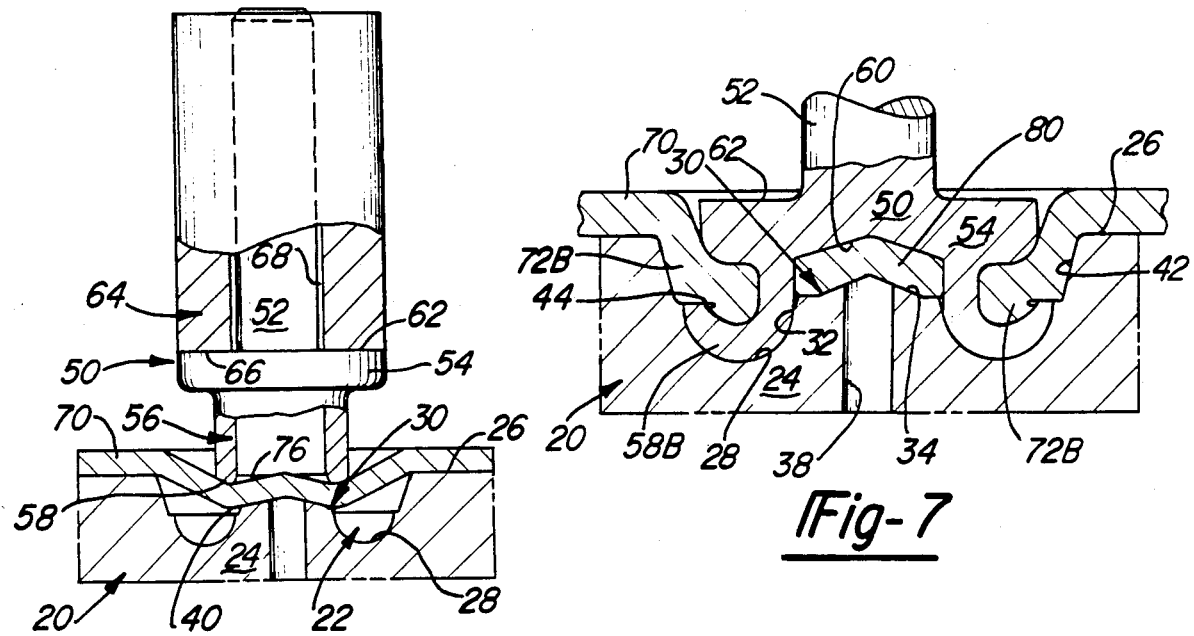
Fig-6
Fig-7

DIE SET FOR SECURING A SELF-ATTACHING ELEMENT

RELATED APPLICATIONS

This application is a continuation-in-part application of my copending application Ser. No. 773,387, filed Sept. 6, 1985, now U.S. Pat. No. 4,633,560, which application is a division of Ser. No. 563,833, filed Dec. 21, 1983, now U.S. Pat. No. 4,555,838. This patent was filed as a continuation in part application of Ser. No. 485,099, filed Mar. 28, 1983, now U.S. Pat. No. 4,459,073 and Ser. No. 504,074, filed June 14, 1983, now U.S. Pat. No. 4,543,701. Such patents were filed as divisional and continuation applications, respectively, of Ser. No. 229,274, filed Jan. 28, 1981, now abandoned, which claims priority from my German application No. 3 003 908, filed Feb. 2, 1980.

DESCRIPTION OF THE PRIOR ART

As described more fully in my co-pending application, the prior art includes self-piercing nuts which may also be simultaneously clinched to secure the nut in the pierce panel opening, such as disclosed in U.S. Pat. Nos. 3,299,500 and 3,314,138 assigned to the assignee of the instant application. The prior art also includes a number of self-riveting nuts, including nuts having an annular skirt or barrel portion which is deformed radially outwardly in a die member to form a mechanical interlock with the panel, see for example U.S. Pat. Nos. 3,938,239 and 4,018,257. The self-riveting nuts disclosed in these patents are however secured to a panel having a pre-pierced panel opening, requiring at least two separate operations. The prior art also discloses means of attaching a stud-like fastener, wherein the stud includes an annular end or barrel portion which penetrates a plate or structural steel member such as disclosed in U.S. Pat. Nos. 4,193,333 and 3,871,264.

It is understood that the prior art also includes various riveting techniques wherein the fastener includes an annular end portion which may be press-fitted through an opening in a panel and the annular end is then riveted radially outwardly by a die member having an annular semi-toroidal die cavity and which may include a projecting central die portion which is received in the annular riveting end of the fastener. Examples of such prior art include U.S. Pat. Nos. 1,976,019, 2,456,118, 2,521,505, 2,564,782, 3,436,803, 3,754,731, 4,039,099 and 4,092,773.

The prior art known to the Applicant does not, however, disclose or suggest an installation apparatus having a die set forming a mechanical interlock between the self-attaching element and the panel wherein the mechanical interlock is stronger than the panel, wherein the self-attaching element may be utilized to pierce the panel in the die set, or wherein the panel slug is incorporated into the fastener system.

The die set of this invention is an improvement over the die set disclosed and claimed in my co-pending application, providing further advantages for the unique self-attaching fastener.

FIELD OF THE INVENTION

The present invention relates to a die set for securing a self-attaching member to a panel wherein the self-attaching element may pierce the panel and the fastener is attached to the panel within the panel opening.

SUMMARY OF THE INVENTION

The die set of the present invention includes a die member and a relatively movable drive member for securing a self-attaching element to a plasticly deformable panel. The self-attaching element, which may be a male or female fastener such as a stud or nut, includes an annular barrel portion having a free open end. Where the self-attaching element is utilized in the die set to pierce the panel, the free end of the barrel portion further includes a piercing surface, such as a sharp piercing edge or an angled annular surface, adjacent the internal surface of the annular barrel portion.

The die member includes a concave annular die cavity, including a bottom surface which is preferably relatively smooth and generally hemispherical in cross-section. The annular die cavity surrounds a center die post which projects from the bottom surface of the die cavity. The die member preferably includes a panel supporting shoulder on at least two sides of the die cavity and preferably surrounds the die cavity to support a panel during installation of the self-fastening element. In the most preferred embodiment, the top face of the center post is spaced below the panel supporting shoulder.

The center post of the die member in the preferred embodiment of this invention includes a conical side surface adjacent the top face which is inclined outwardly from the axis of the post. The conical side surface blends with the smooth bottom surface of the die cavity and the bottom surface further defines a portion of the side surface of the post, preferably forming a relatively smooth continuous surface.

The panel is supported preferably in fixed relation on the die member overlying the annular die cavity. Where the panel is pre-pierced, the panel opening is coaxially aligned with the center post, preferably having a diameter generally equal to or less than the diameter of the center post at the top face. The drive member aligns the self-attaching element, with the barrel portion facing the panel and the internal surface of the barrel portion coaxially aligned with the conical side surface of the die member center post. The drive member then drives the self-attaching element barrel portion through the panel opening into engagement with the conical side surface of the center post and then into contact with the hemispherical bottom surface of the die cavity, thereby deforming the barrel portion free end radially outwardly into a U-shape in cross-section. The panel portion adjacent the panel opening is simultaneously deformed into the die cavity and driven into the developing U-shaped barrel portion, forming a secure mechanical interlock.

The conical side surface of the die member center post has several important functions and advantages over the prior art and the die member disclosed in my above identified co-pending applications. First, the conical surface automatically centers the self-fastening element on the die post. If the barrel portion is misaligned, the conical surface centers the barrel portion on the post, which is important to assure a good assembly. Second, the conical surface reduces the force required to radially deform the barrel portion by immediately beginning the radial outward flow of the barrel upon the downward movement of the drive member. Finally, the conical surface reduces the chances of barrel collapse resulting from the longitudinal force provided by the drive member, which may occur particularly where the barrel portion is not accurately aligned with the center post.

Where the self-attaching element pierces the panel during the installation, the top face of the die member center post preferably includes an annular top face adjacent the conical side surface and these surfaces form a relatively sharp piercing edge. This piercing edge cooperates with the piercing surface of the self-attaching element barrel portion to pierce a slug from the panel and form a panel opening for receipt of the barrel portion. Where the top face of the die member center post is spaced below the plane of the panel supporting shoulder, the panel is first deformed into the die cavity against the center post, prior to piercing the panel. This further assures accurate alignment and piercing of the panel.

Where the self-attaching element is a male fastener, such as a stud or bolt, the annular barrel portion further includes a bottom wall spaced from the free end forming an enclosed cavity. The die member for such installations preferably includes a projecting conical surface on the top face of the center post which receives, supports and aligns the panel slug and drives the panel slug against the bottom wall of the barrel portion to permanently retain the slug in the barrel portion. This embodiment also preferably includes a bore through the top conical surface of the center port which relieves pressure build-up as the panel slug is driven against the bottom wall of the barrel portion.

BRIEF DESCRIPTION OF THE DRAWINGS

FIG. 5 is a partially cross-sectioned view following installation of the self-attaching element;

FIG. 6 is a partially cross-sectioned view of the die set wherein the self-attaching element is about to pierce a slug from the panel; and FIG. 7 is a partially cross-sectioned view, similar to FIG. 6, following installation.

DESCRIPTION OF THE PREFERRED EMBODIMENTS OF THE INVENTION

The die set of this invention is particularly adapted for permanent attachment of a self-attaching fastener to a plate or panel, particularly in metal sheet or the like, such as utilized by the automotive industry for component parts. The die set of this invention may be installed in a conventional press, such as utilized by the automotive industry to form sheet metal parts, including body parts and the like. In such applications, the press installs one or more elements with each stroke of the press, wherein the element becomes a permanent part of the panel and may be utilized to affix other structural members, such as brackets or the like, to the panel. As described, the self-attaching elements may be a male or female fastener element, such as a stud, bolt or nut-type fastener. The self-attaching element may also be a bearing element, such as a male or female bearing element or the element may form part of a joint, such as a ball joint where the element includes a shank portion and a ball on the free end of the shank portion. As used herein, "panel" refers to any plate, panel or metal sheet having a thickness thin enough for forming the preferred mechanical interlock. The self-attaching element is preferably formed of a metal, preferably steel, particularly where the elements pierce the panel during the installation.

Figure 1:
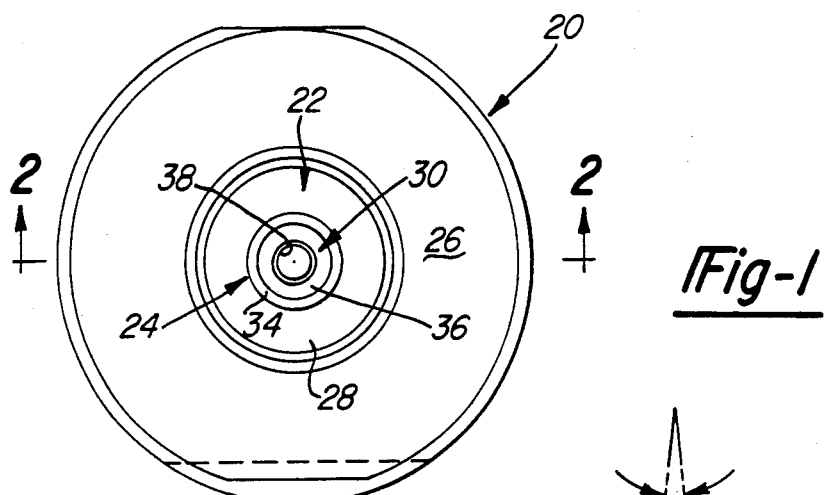
FIG. 1 is a top view of a die member utilized in the die set of this invention.
Figure 2:
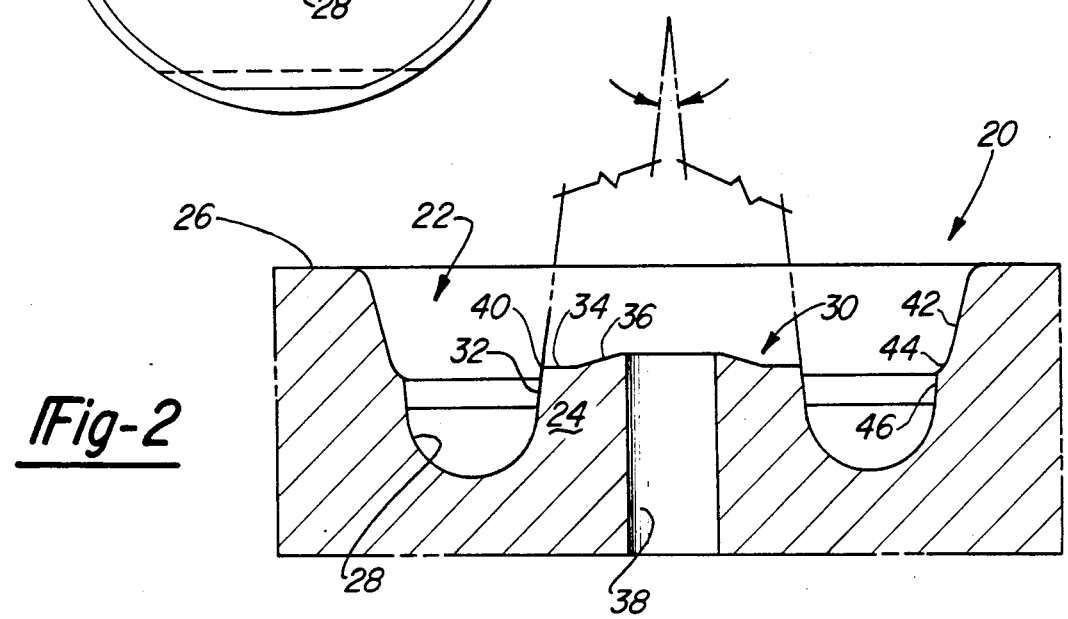
FIG. 2 is a cross-sectional view of the die member shown in FIG. 1 in the direction of view arrows 1—1.

FIGS. 1 and 2 illustrate a preferred embodiment of the die member 20 which includes an annular concave die cavity 22 which surrounds a center post 24 and which is surrounded by a panel supporting shoulder 26. The bottom surface 28 of the die cavity is preferably substantially smooth and generally hemispherical in cross-section. The top face 30 of the central post 24 preferably includes a conical side surface 32 which smoothly blends into the bottom surface 28 of the die cavity. The top face 30 of the post in the disclosed embodiment includes an annular top surface 34, which is generally perpendicular to the axis of the center post, a projecting conical surface 36 and a central bore 38. Where the die set is utilized to pierce the panel, as described above, the conical side surface 32 preferably terminates in a relatively sharp piercing edge 40, as described more fully hereinbelow.

The outer surface of the die cavity preferably includes a tapered or conical outer surface 42 which terminates in a generally radially projecting lip 44 which blends into the toroidal concave bottom surface 28 through a generally cylindrical surface 46 in the disclosed embodiment. As described more fully in my above-referenced co-pending application, the outside surface of the die cavity 22 supports and guides the panel during installation of the self-attaching element.

Figure 3:
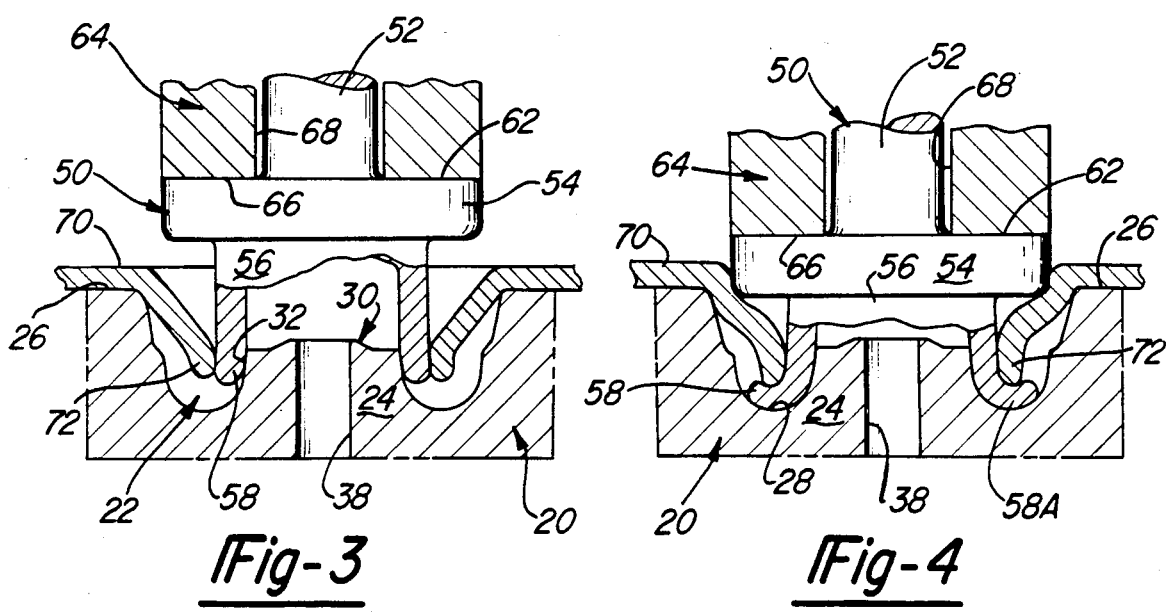
FIG. 3 is a partially cross-sectioned view of a die set wherein in the self-fastening element is being installed in a pre-pierced panel opening.
Figure 4:
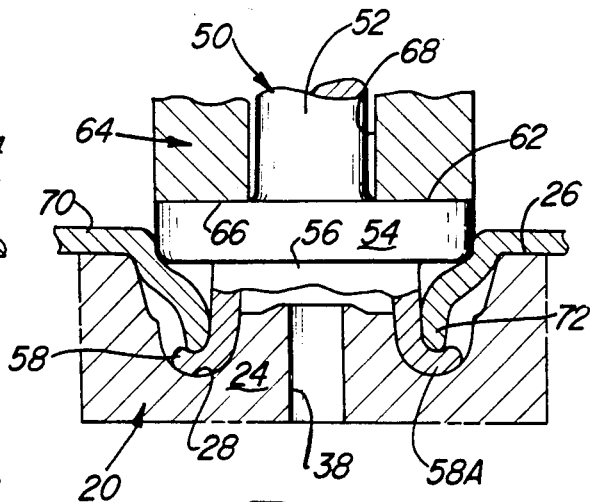
FIG. 4 is a partially cross-sectioned view of the die set of FIG. 3 during a further stage of the installation.

FIGS. 3 and 4 illustrate the operation of the die set during installation of a self-attaching element 50. The disclosed embodiment of the self-attaching element is a male stud-type element having a shank or stud portion 52, a radial flange portion 54 and an annular barrel portion 56 having a free end 58. The disclosed embodiment of the stud fastener includes a bottom wall or surface 60, as shown in FIG. 5, enclosing the barrel portion. The top surface 62 of the radial flange portion 54 defines a driven surface of the stud fastener. The drive member 64 includes an annular drive surface 66 which bears against the driven surface 62 of the stud fastener and the disclosed embodiment of the drive member includes a bore 68 which received the shank portion 52 of the stud fastener.

As described more fully in my above identified prior applications and my related U.S. application Ser. No. 657,570, filed Oct. 4, 1984, now U.S. Pat. No. 4,610,072, the disclosure of which is incorporated herein by reference, the installation apparatus preferably includes a plunger which aligns the self-attaching element relative to the die member and guides the element during installation. The installation apparatus generally includes a die member 20 and an installation head, not shown except for the plunger 64. The die member 20 may be attached to one element or die platten of a die press and the installation head is attached to the other die element or platten. The plunger, which in this case is the drive member 64, moves relative to the die member 20 to install the element in a panel 70 which is supported in fixed relation on the panel supporting shoulder 26 of the die member 20. As will be understood, the terms "top" and "bottom" are relative terms and are used herein for ease of description only. In an actual application, the die member 20 may be attached to the upper moveable die member of the press or the self-attaching element 50 may be driven upwardly by the drive member 64.

One installation sequence is shown in FIGS. 3 to 5, wherein the self-attaching element 54 is being installed in a pre-pierced or pre-formed panel opening. The panel portion 72 adjacent the panel opening is initially driven into the die cavity 22 by the free end 58 of the barrel portion 56, as described more fully in the above identified prior applications. The diameter of the panel opening is preferably generally equal to or slightly less than the diameter of the center post 24 at the top face 30. The inner surface of the annular barrel portion 56 initially engages the conical side surface 32 of the center post, as shown in FIG. 3. As described, the conical surface 32 accurately centers the barrel portion 56 on the center post and reduces the forces required to radially deform the barrel portion by immediately beginning radial outward flow of the barrel portion upon downward movement of the self-attaching element by the drive member 64. Further, the conical side surface 32 reduces the chances of barrel collapse during installation which may result from inaccurate alignment of the barrel portion. Thus, the conical surface 32 performs a very important function in the die set of this invention.

As the drive member 64 continues to drive the self-attaching element into the die cavity 22, the free end 58 of the barrel portion is deformed against the semi-toroidal concave bottom surface 28 of the die cavity, as shown in FIG. 4, forming a hook-shaped end portion 58A. The panel portion 72 adjacent the panel opening is simultaneously driven into the hook-shaped barrel portion 58A by the radial flange 54 of the self-attaching element, as shown in FIG. 4. Finally, as shown in FIG. 5, the panel portion 72A adjacent the panel opening is deformed in the U-shaped barrel portion 58B, forming an annular rib 72A as the radial flange 54 of the self-fastening element is driven into the panel. The bore 38 through the die member permits escape of entrapped debris and prevents pressure build-up. As shown, the resultant fastener assembly includes a very secure mechanical interlock between the U-shaped barrel portion 58B and the panel portion 72A, which is securely entrapped within the U-shaped barrel portion. Further, the conical outer side surface 42 and the lip 44 guide and support the intermediate panel portion 72B.

FIGS. 6 and 7 illustrate a more preferred method of installing the disclosed embodiment of the stud-fastener 50, wherein the die member cooperates to pierce a slug from the panel, as now described. The disclosed embodiment of the stud fastener in FIGS. 6 and 7 may be identical to the stud fastener disclosed in FIGS. 3 to 5, however, the barrel portion 54 includes a piercing surface 76 as described in the above identified prior applications. The piercing surface 76 may also be included in the stud fastener previously described, but is not required. The self-attaching elements are therefore numbered the same.

The installation sequence shown in FIGS. 6 and 7 is substantially the same as the installation sequence in FIGS. 3 and 4 except for the initial piercing operation. The panel 70 is preferably first deformed into the die cavity 22, as shown is FIG. 6, as the drive member 64 drives the barrel portion 56 against the panel, deforming the panel against the top face 30 of the center post 24. The panel is then centered and supported upon the center post during piercing of the panel. As shown, the piercing surface 76 of the barrel portion and the piercing edge 40 of the center post are coaxially aligned and continued movement of the drive member toward the die member pierces a slug 80 from the panel, as shown in FIG. 7. The barrel portion free end is then deformed radially outwardly into a U-shape 58B in cross-section and the panel portion 72B adjacent the pierce panel edge is deformed in the developing U-shaped portion to form a secure mechanical interlock, as described above in regard to FIGS. 3 to 5.

In this application, however, the panel slug 80 becomes an integral part of the installation. The top face 30 of the die member center post 24 drives the panel slug 80 against the bottom wall 60 of the barrel portion and the conical surface 34 deforms the panel slug against the bottom wall 60, assuring permanent retention of the slug 80 in the barrel portion. The bore 38 prevents entrapment of air and permits escape of debris during the installation. In prior installations without the bore; the pressure has been sufficient to lift the self-attaching element and panel assembly off of the die member.

As described, the die set of this invention is suitable for attaching a self-attaching element to a panel having a preformed panel opening as described in regard to FIGS. 3 to 5, or more preferably the panel may be pierced during the installation, as shown in FIGS. 6 and 7. As described, particularly in my above identified prior applications, the piercing and installation of the self-attaching element in one continuous operation is most preferred because it eliminates a separate step. However, in certain limited applications, the panel opening is preformed. In such applications, it is not necessary to include a piercing edge 40 on the die post and the configuration of the top face 30 of the die post is not critical.

Having described preferred embodiments of the die set of this invention, I now claim the invention as follows:

1. A die set, including a die member and a relatively movable drive member for securing metal self-attaching elements to a metal plastically deformable panel, said self-attaching elements each having an annular barrel portion including a free open end, said die member having a generally planar panel supporting surface at least partially surrounding a concave annular die cavity including a bottom surface which is relatively smooth and generally hemispherical in cross-section, said annular die cavity surrounding a center post projecting from said bottom surface, said center post having a top face spaced below said panel supporting surface and a conical side surface adjacent said top face which is inclined outwardly from the axis of said post, said top face forming a relatively sharp piercing edge which cooperates with a piercing surface on the free end of said self-attaching element annular barrel portion to pierce a slug from said panel, said conical surface smoothly blending with said die cavity hemispherical bottom surface and said bottom surface and defining a portion of the side surface of said post, said drive member aligning said self-attaching element with said die member with the internal surface of said annular barrel portion generally coaxially aligned with said center post conical side surface, the internal diameter of said barrel portion internal surface generally equal to the minor diameter of said post side conical surface, and a panel supported in fixed relation on said die member panel supporting surface overlying said die cavity, said drive member driving said self-attaching element barrel portion free end through an opening in said panel into engagement with said center post conical side surface and then into contact with said die cavity bottom surface, deforming said barrel portion free end radially outwardly into a U-shape in cross-section and said die set simultaneously deforming said panel adjacent said opening into said U-shaped barrel portion, forming a secure mechanical interlock.

2. The die set defined in claim 1, characterized in that said die member center post top face further including a projecting conical surface adjacent the axis of said center post which receives said panel slug, said barrel portion having a bottom wall defining a generally cylindrical enclosure and said center post conical surface driving said panel slug against said barrel portion bottom wall to retain said slug in said barrel portion.

3. The die set defined in claim 2 characterized in that said die member center post top face further including a bore through said conical surface relieving pressure as said panel slug is driven against said self-attaching element barrel portion bottom wall.

4. A die set including a die member and a relatively movable drive member for securing metal self-attaching elements to a metal plastically deformable panel, said self-attaching elements each having an annular barrel portion including a free open end including a piercing surface adjacent said free end, said die member having a generally planar panel supporting surface at least partially surrounding a concave annular die cavity including a bottom surface which is relatively smooth and generally hemispherical in cross-section, said annular die opening surrounding a center post projecting from said bottom surface, said center post having a top face spaced below the plane of said panel supporting surface including a piercing edge surrounding said top face and a conical side surface adjacent said top face inclined outwardly from the axis of said post, said conical surface smoothly blending with said hemispherical bottom surface and defining a portion of the side surface of said post adjacent said conical side surface, said drive member aligning said self-attaching element with said barrel portion free end facing a panel fixedly supported on said panel supporting surface overlying said annular die cavity and said piercing surface of said barrel portion generally coaxially aligned with said piercing edge of said die member center post, the internal diameter of said annular barrel portion adjacent said piercing edge being generally equal to the minor diameter of said conical surface, said drive member driving said self-attaching element barrel portion free end into engagement with said panel, and said self-attaching element piercing surface and said die member post piercing edge cooperating to pierce a slug from said panel, said drive member then driving said barrel portion free end into engagement with said die member center post conical side surface and then into engagement with said bottom surface, deforming said barrel portion free end radially outwardly into a U-shape in cross-section and simultaneously deforming said panel adjacent said pierced panel opening into said U-shaped barrel portion, forming a secure mechanical interlock.

5. The die set defined in claim 4, characterized in that said die member center post top face includes a projecting conical surface which receives said panel slug, said self-attaching element barrel portion having a bottom wall and said center post conical surface driving said panel slug against said barrel portion bottom wall to retain said slug in said barrel portion.

6. The die set defined in claim 5, characterized in that said die member center post top face further including a bore extending through said conical surface, generally in the axis of said conical surface, which relieves pressure build-up as said panel slug is driven against said barrel portion bottom wall.

7. A die set, including a die member and a relatively movable drive member for securing metal self-attaching elements to a metal plastically deformable panel, said self-attaching elements each having an annular barrel portion terminating in a free open end having a piercing surface adjacent said free end and a bottom surface defining a generally cylindrical enclosure, said die member having a concave annular die cavity including a bottom surface which is generally smooth and generally hemispherical in cross-section, said annular die cavity surrounding a center post projecting from said bottom surface, said center post having a top face including a projecting conical surface adjacent the axis of said center post which receives a slug pierced from said panel and a conical side surface adjacent said top face which is inclined outwardly from the axis of said post, said conical side surface blending with said die cavity bottom surface and said bottom surface defining a portion of the side surface of said post, said drive member aligning said self-attaching element with said die member with the internal surface of said annular barrel portion generally coaxially aligned with said center post conical side surface, and a panel supported in fixed relation on said die member overlying said die cavity, said drive member driving said self-attaching element barrel portion free end into piercing engagement with said panel through the opening formed in said panel into engagement with said center post conical side surface and then into contact with said die cavity bottom surface, the slug pierced from said panel being received on said projecting conical top surface of said center post against said barrel enclosure portion bottom surface to retain said slug in said barrel portion and said die cavity deforming said barrel portion free end radially outwardly to form a mechanical interlock with said panel.

8. The die set defined in claim 7, characterized in that said die member center post top face further includes a bore through said conical top surface relieving pressure as said panel slug is driven against said self-attaching element barrel portion bottom surface.

* * * * *